United States Patent
La Fave et al.

[11] 3,830,561
[45] Aug. 20, 1974

[54] REMOTELY OPERABLE VEHICULAR MIRROR

[76] Inventors: Veryl L. La Fave, 4503 E. 14th St., Cheyenne, Wyo. 82001; Ronald D. Rivenes, 4103 "R" St., Omaha, Nebr. 68107

[22] Filed: Aug. 6, 1973

[21] Appl. No.: 386,155

[52] U.S. Cl. .............................. 350/289, 350/307
[51] Int. Cl. ............................................. G02b 5/08
[58] Field of Search ........... 350/289, 303, 304, 307; 74/801, 501 M

[56] References Cited
UNITED STATES PATENTS

| | | | |
|---|---|---|---|
| 3,005,384 | 10/1961 | Baird et al. | 350/289 |
| 3,008,375 | 11/1961 | Henderson | 350/289 |
| 3,429,639 | 2/1969 | Peters | 350/289 |
| 3,492,065 | 1/1970 | Kurz | 350/289 |
| 3,552,836 | 1/1971 | Oskam | 350/289 |
| 3,610,736 | 10/1971 | Bateman | 350/289 |

*Primary Examiner*—Ronald L. Wibert
*Assistant Examiner*—F. L. Evans
*Attorney, Agent, or Firm*—Jack C. Munro

[57] ABSTRACT

A mirror apparatus for attachment to the exterior of a vehicle wherein the mirror is located upon a mirror housing, the mirror housing being rotatably secured to a frame which is fixedly secured to the vehicle, a speed reduction motor assembly being located within the mirror housing, the motor assembly being attached to the mirror housing adjacent one end thereof with the shaft of the motor being fixedly secured to the frame, a vibration damping means located at the end opposite the shaft connection intermediate the connection of the mirror housing to the frame.

3 Claims, 4 Drawing Figures

PATENTED AUG 20 1974　　　　　　　　　　　　　　　　3,880,561

INVENTORS
VERYL L. LAFAVE
RONALD D. RIVENES
BY
Jack C. Munro
—AGENT—

REMOTELY OPERABLE VEHICULAR MIRROR

BACKGROUND OF THE INVENTION

In the operation of automotive vehicles, particularly trucks, the operator must view, for safety reasons, the road behind the vehicle. Normally, such observation is accomplished through the use of mirrors on one or both sides of the vehicle. Because drivers of different physical size operate the same vehicle, such mirrors are adjustable as by pivoting about a central axis. However, the mirror on the right side of the vehicle is too remote from the drivers position to be adjusted with the driver located in the driving position. On large sized trucks, the same situation occures with the mirror on the left side of the vehicle.

Some cargo vehicles consist of a trailer and a tractor with the trailer being pivotally connected to the tractor. Normally, the mirrors employed on such vehicles are adjusted so that the driver can view the road directly behind the trailer when they are traveling on a straight road. However, when the tractor and trailer are not aligned as when the tractor is turned sharply to manuever the trailer into a tight space or backing toward a loading platform, the mirrors do not give the operator a view of the rear of the trailer which is the critical area to be observed in this instance. For example, when backing toward a loading dock the trailer and tractor are out of alignment, the mirror on one side of the truck will provide the driver with a view of the side wall of the trailer with the mirror on the opposite side providing a view of the area far to the side of the trailer, as a result the back of the trailer is obscured from his view.

Another difficulty of of present day mirror structures is that the mirror frame proveides a convenient hand hold during cleaning of the truck windshield. As a result, almost everytime the truck is serviced, it is necessary to readjust the mirrors. The adjustment proceedure is time consuming especially for the mirror on the side opposite the drivers side.

To overcome the above noted difficulties it has been common to provide some means to effect mirror adjustment from the drivers position within the tractor of the vehicle. The most common form of such adjustment apparatus employes the use of an electric motor assembly. However, one of the primary disadvantages of previously employed apparatus is that the apparauts to effect the adjustment of the mirror is quite complex. It is well known that complexity, besides increasing initial cost, also increases maintenance. It has been found that maintenance is an extremely important factor in the employment of a remotely adjustable mirror. The mirror apparauts must be rugged enough to withstand continual abuse over a period of years without becoming inoperative. Truck drivers will not take the time to place their vehicle in the shop for repair of a mirror adjusting apparatus.

A second disadvantage to the aforementioned previous type of mirror adjusting apparatuses is that the motor assemblies are usually located exteriorly of the mirror housing and therefore are exposed to the elements. Frequently, the combination of dust, moisture and low temperatures cause the motor assembly to become inoperative. An additional disadvantage of the previous adjustable mirror apparatuses is that the constructions of such apparatuses involve the use of special structure which necessitates the replacement of the entire conventional manual mirror adjustment structure which is in widespread use. Clearly, by not making use of the conventional mirror braces and supports, the cost of employing a remotely adjustable mirror apparatus has previously been substantial.

Also, it has been found that a further disadvantage of previous structure is that the motor assembly exhibits a small amount of vibration during use. These undesirable vibrational forces over a period of time frequently cause premature failing of the mirror structure due to fatigue stress.

It is desirable to employ the use of a remote control mirror adjustment apparatus which can be readily employed upon conventional mirror supporting structure, employs the use of a motor assembly which is not exposed to the elements and which is non-complex in design.

SUMMARY OF THE INVENTION

The remote control mirror adjustment apparatus of this invention provides for the employment of the conventional mirror supporting frame structure which is commonly employed upon vehicles. The mirror is to be supported within a mirror housing which is pivotally mounted upon the frames. A motor assembly which includes the use of a planetary gear system to effect speed reduction of the motor is mounted within the mirror housing adjacent one end thereof. To decrease the possibility of damage due to undesirable vibrational effects, a damping means is to be located between the motor housing and the mirror housing. The shaft of the motor is to coincide with the pivotal axis of the mirror housing and be attached in a fixed manner to the frame. The opposite end of the mirror housing is pivotally connected to the frame with a vibrational damping means being located between the mirror housing and the frame. A momentary switch is to be employed within the tractor of the vehicle which permits fine adjustment by the driver of the mirror housing with respect to the frame.

An object of the apparatus of this invention is to provide a mirror apparatus which can be readily employed in conventional mirror support mechanisms.

It is another object of the apparatus of this invention to employ a mirror apparatus which can be adjusted in extremely small increments.

It is another object of the apparatus of this invention to provide a mirror apparatus which cannot be adjusted manually but only by activation of an electric motor.

It is another object of this invention to provide a mirror apparatus which can be readily readjusted upon misalignment of the mirror.

It is another object of the apparatus of this invention to provide a mirror apparatus which is relatively non-complex and low in initial cost and low in maintenance.

DETAILED DESCRIPTION OF THE SHOWN EMBODIMENT

Figure 1:
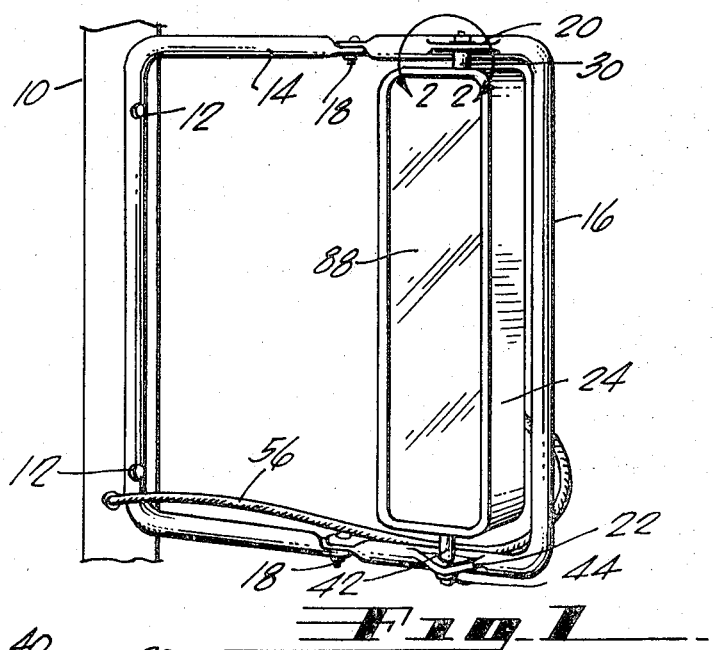
FIG. 1 is a perspective view of the mirror apparatus of this invention as it would be installed within a typical installation.
Figure 2:
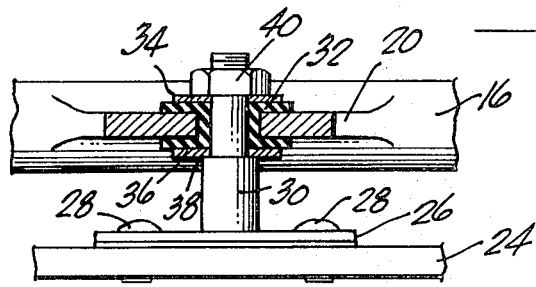
FIG. 2 is an enlarged partly-in-section view of the upper pivotal connection of the mirror housing to the frame taken along line 2—2 of FIG. 1.
Figure 4:
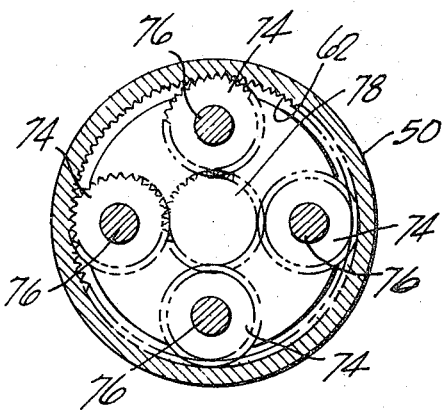
FIG. 4 is a partly-in-section view showing in more detail a portion of the speed reduction mechanism employed in conjuction with the motor of this invention taken along line 4—4 of FIG. 3.
Figure 3:
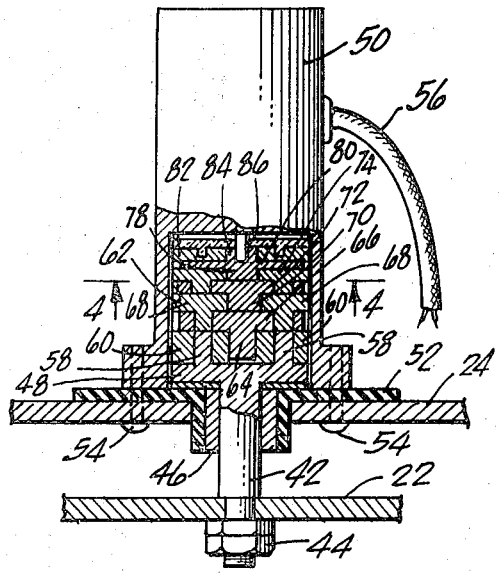
FIG. 3 is an enlarged partly-in-section view of the motor assembly employed to effect pivoting movement of the mirror within this invention.

Referring particularly to FIG. 1 of the drawing, there is shown a side wall 10 of a vehicle to which has been secured, by bolt fasteners 12, an inner bracket 14. Inner bracket 14 is substantially U-shaped in configuration and to which has been attached by bolts 18 an outer bracket 16. Normally, the desired angular relationship between outer bracket 16 and inner bracket 14 is establish at the time of installation of the entire assembly to the sidewall 10 of the vehicle. The bolts are then tightened resulting in a fixing of the established angular relationship. It is possible that during the entire use of the mirror assembly that no adjustment of the inner bracket with respect to the outer bracket be necessary.

Integrally connected to the upper portion of outer bracket 16 is a first flange 20 with a second flange 22 being similarly located upon the lower portion of the outer bracket 16. Mirror housing 24 at its uppermost end is fixedly attached to a plate 26. Plate 26 is secured as be rivets 28 to the mirror housing 24. Secured to plate 26 is a first pivot shaft 30 which is to pivotally cooperate within an aperture located within the first flange 20. Located in between the first shaft 30 and the first flange 20 is a vibration damping element 32. It is envisioned that element 32 is to be constructed of a non-metallic resilient material such as rubber or the like. Located upon shaft 30 upon each side of element 32 are washers 34 and 36. Washer 36 is to rest against shoulder portion 38 of the first pivot shaft 30. Washer 36 is in contact with nut 40 and by tightening or loosening of nut 40 the friction of the connection between the shaft 30 and the element 32 can be varied. It is to be noted that by the inserting of element 32 between the shaft 30 and the first flange 20, small amounts of movement as would be caused by vibration are absorbed and are not transferred to the outer bracket 16.

At the lower end of the mirror housing 24, a second pivot shaft 42 is fixedly secured by the double nut assembly 44 to the second flange 22. It is to be understood that an aperture is located within the second flange 22 to facilitate such cooperation. Although not shown it may be desired to provide a vibration damping means similar to element 32 between shaft 42 and flange 22. The function of such a damping means would be to insure substantially total absorption of all undesirable vibrational forces. Second pivot shaft 42 passes through bearing 46 and is connected to plate 48. Bearing 46 is attached to a motor housing 50 which is to contain a motor (not shown) adjacent the uppermost end thereof. To further insure complete absorption of any undesirable vibrational forces, motor housing 50 is securely fixed to the mirror housing 24 with vibration damping washer 52 located therebetween. Bolts 54 function to retain the motor housing 50 to the mirror housing 24 with the washer 52 located therebetween. It is to be understood that the material of construction of washer 52 may be composed of any vibrational damping material such as rubber or the like.

Electrical conduit 56 is connected to the motor (not shown) with the conduit 56 passing through the side wall 10 to within the vehicle. Located at the end of conduit 56 is a momentary switch (not shown) which is to be placed to be readily operable by the driver of the vehicle. The motor is to be of the reversable type with the direction of movement thereof to be controlled by the momentary switch.

The plate 48 is located within the motor housing 50 and has four integrally connected upstanding shafts 58 attached thereto. Each shaft 58 rotatably supports a planet gear 60. Each of the planet gears 60 are rotatable about a ring gear 62 which is fixed to the interior of housing 50 with a sun gear 64 centrally located between each of the planet gears 60. Sun gear 64 is integrally connected to a second plate 66. Second plate 66 cooperates in a similar manner with planet gears 68, with the planet gears 68 cooperating also in a similar manner with ring gear 62 and a sun gear 70. In a still similar manner, sun gear 70 is connected to a third plate 72 which in turn is associated with planet gears 74. Planet gears 74 are rotatably connected by shafts 76 to the third plate 72. Again in a similar manner, a sun gear 78 is centrally located between the planet gears 74 and is also integrally connected to a fourth plate 80. Fourth plate 80 is pivotally secured to planet gears 82 which are in turn driven by a centrally located sun gear 84. Motor shaft 86 is drivingly connected to sun gear 84. It is to be understood that each of the planetary gear assemblies previously described have four planet gears operating about a sun gear. It is also to be understood that each of the planetary gear assemblies operates in series, that is, a speed reduction occurs between shaft 86 and the fourth plate 80 with a furthe speed reduction occuring between sun gear 78 and third plate 72 and so forth until a much greater speed reduction results at the output shaft 42. It is to be noted that the thickness of each of the planetary gear assemblies increases from the innermost planetary gear system to the outermost planetary system. This is for the reason that greatest torque is placed upon the outermost planetary gear system and therefore must be formed of a stronger construction. It is to be further noted that the shaft 86 is in axial alignment with shaft 42 and also with shaft 42 being in axial alignment with shaft 30. This arrangement further helps to eliminate undesirable vibrational movements caused during rotation of the mirror housing 24 by action of the motor.

The operation of the mirror assembly of this invention is as follows: If the driver of the vehicle decides by glancing into mirror 88, attached to the mirror housing 24, that he is not able to observe directly to the rear of the vehicle, the driver activates the momentary switch (not shown) to rotate the mirror 88 and the mirror housing 24 in either a clockwise or counter clockwise direction (whatever is desired). A rotation of the mirror housing 24 is effected by means of the power output of the motor from the shaft 86 being transmitted through the planetary gear assemblies resulting in rotation of shaft 42. As shaft 42 is fixed to the second flange 22 with relative rotation therebetween not being permitted, rotation of the motor housing and connected mirror housing 24 occurs about shaft 42. Shaft 30 which is fixed to the mirror housing 24 rotates with respect to the first flange 20. In this manner, pivotal movement of the mirror 88 with respect to the vehicle occurs until the driver realizes the desired location of the mirror 88 has been established at which time release of the momentary switch occurs.

We claim:
1. A mirror assembly comprising:
a frame;
a substantially rectangular mirror housing pivotally secured to said frame at a first connection and a second connection, said mirror housing having a pair of parallel side walls and a pair of parallel end walls, the axes of said first and said second connections being in alignment and equally spaced from said side walls, at least one outer surface of said mirror housing comprising a mirror; and
a motor assembly fixedly located within said mirror housing, said motor assembly including a motor, said motor driving a motor drive shaft, said motor drive shaft to operate a speed reduction mechanism which in turn operates a power output shaft, said motor drive shaft being in alignment with said power output shaft, the longitudinal axis of said output shaft being aligned with said axis of said first and said second connections, said motor assembly being located adjacent said first connection, said power output shaft comprises said first connection, said mirror housing being pivotaly movable relative to said frame by said motor assembly;
said second connection includes a first vibration damping means to absorb vibrational movement of said mirror housing with respect to said frame;
said first vibration damping means comprising a rubber grommet located intermediate said frame and said mirror housing;
said speed reduction mechanism includes a plurality of spaced apart interconnected planetary gear systems, each of said planetary gear systems includes a single sun gear and a plurality of planet gears, whereby by using said plurality of planetary gear systems not only is said mirror housing rotated slowly, but said mirror housing stops almost instantaneous upon deactivation of said motor.

2. A mirror assembly as defined in claim 1 wherein:

a non-metallic second vibration damping means is located between said motor housing and said mirror housing.

3. A mirror assembly as defined in claim 2 wherein:

a non-metallic third vibration damping means is located about said first connection intermediate said frame and said mirror housing.

* * * * *